(12) United States Patent
Ding et al.

(10) Patent No.: US 12,205,310 B1
(45) Date of Patent: Jan. 21, 2025

(54) METHOD AND APPARATUS FOR IMAGE STITCHING

(71) Applicant: SHANGHAI HANSHI INFORMATION TECHNOLOGY CO., LTD., Shanghai (CN)

(72) Inventors: Kun Ding, Shanghai (CN); Shuai Yang, Shanghai (CN); Wangpei Li, Shanghai (CN); Sheng Huang, Shanghai (CN); Yitang Zhuang, Shanghai (CN)

(73) Assignee: SHANGHAI HANSHI INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/732,365

(22) Filed: Jun. 3, 2024

Related U.S. Application Data

(63) Continuation of application No. 18/677,537, filed on May 29, 2024, now abandoned.

(30) Foreign Application Priority Data

Sep. 11, 2023 (CN) .......................... 202311167983.3

(51) Int. Cl.
*G06T 7/33* (2017.01)
*G06T 3/4038* (2024.01)
*G06T 3/4046* (2024.01)

(52) U.S. Cl.
CPC ............ *G06T 7/337* (2017.01); *G06T 3/4038* (2013.01); *G06T 3/4046* (2013.01); *G06T 2207/20016* (2013.01); *G06T 2207/20084* (2013.01)

(58) Field of Classification Search
CPC ...... G06T 7/337; G06T 3/4038; G06T 3/4046
See application file for complete search history.

(56) References Cited

U.S. PATENT DOCUMENTS

2020/0211158 A1\* 7/2020 Miyamaki ............ G06T 3/4038
2022/0315131 A1 10/2022 Ibaragi et al.

FOREIGN PATENT DOCUMENTS

CN 113706635 A 11/2021
CN 114972030 A 8/2022
(Continued)

OTHER PUBLICATIONS

Japanese Patent Office, First Office Action issued for corresponding Japanese Patent Application 2024-62062 mailed on Jul. 9, 2024 (4 pages).

(Continued)

*Primary Examiner* — Sam Bhattacharya
(74) *Attorney, Agent, or Firm* — Nutter McClennen & Fish LLP

(57) ABSTRACT

The disclosure discloses a method and a device for image stitching, the method including: performing stitching feature extraction on target images based on deep-learning neural-network model to obtain stitching features of the target images; selecting a reference image and a to-be-registered image from the target images; taking the stitching feature of the reference image under a minimum feature size and on the to-be-stitched side as a first stitching feature; calculating the similarity measure value between the first stitching feature and each of second stitching features to obtain a target stitching feature, based on the second stitching features of the to-be-registered image under the minimum feature size; repeating the above steps until the target stitching feature of the to-be-registered image under the maximum feature size is determined, and performing image stitching of the refer- (Continued)

ence image and the to-be-registered image on the to-be-stitched side.

19 Claims, 7 Drawing Sheets

(56) References Cited

FOREIGN PATENT DOCUMENTS

| CN | 115424051 A | 12/2022 |
|---|---|---|
| JP | 2009044612 A | 2/2009 |
| JP | 7188613 B2 | 12/2022 |

OTHER PUBLICATIONS

Extended European Search Report issued on Nov. 20, 2024 for counterpart European patent application No. 24183220.3 (10 pages).
Jiang, Z., et al., Towards All Weather and Unobstructed Multi Spectral Image Stitching Algorithm and Benchmark, Proceedings of the Genetic and Evolutionary Computation Conference, Oct. 2022 (9 pages).
Nie, L., et al., Learning Edge-Preserved Image Stitching from Large Baseline Deep Homography, Dec. 11, 2020 (12 pages).
Zhao, Q., et al., Image stitching via deep homography estimation, Neurocomputing, vol. 450 Apr. 1, 2021 (11 pages).

\* cited by examiner

METHOD AND APPARATUS FOR IMAGE STITCHING

CROSS-REFERENCE TO RELATED APPLICATION

This application claims priority to Chinese Invention patent application No. 202311167983.3, entitled 'method and apparatus for image stitching', and filed on Sep. 11, 2023, which is hereby incorporated by reference in its entirety.

TECHNICAL FIELD

The present disclosure relates to the technical fields of image processing and artificial intelligence, and in particular to a method and an apparatus for image stitching.

BACKGROUND

This portion is intended to provide background or context for embodiments of the disclosure set forth in the claims. The description herein is not acknowledged as the prior art just because it is included in this portion.

Image stitching technology refers to a method of stitching multiple overlapping images of the same scene into a large image. General paradigm of the traditional image stitching method is composed of feature point extraction, feature matching, transformation matrix estimation, image transformation and image fusion. Also, different traditional image stitching methods mainly adopt different methods at different stages in the paradigm. With the rise of deep-learning, image stitching based on deep-learning has also developed rapidly. Most of the image stitching methods based on deep-learning are similar to traditional image stitching methods, to extract features mainly through deep neural-network to learn and obtain optimal transformation-matrix parameters for subsequent image transformation and image fusion.

However, many actual image stitching scenes have the problems of short distance, large parallax, multiple images and large size, and there are many problems when using the above mentioned stitching methods. For example, when large-size images need to be stitched, features cannot be extracted (too much memory) by the traditional stitching methods; and when images with large parallax need to be stitched, the current stitching methods based on deep-learning may produce an image with a large amount of ghost, and the stitching effect is poor.

SUMMARY

Embodiments of the disclosure provide an image stitching method to improve applicability of image stitching, improve accuracy and speed of feature extraction of the image stitching, and improve efficiency and accuracy of the image stitching, the method including:

performing stitching feature extraction on target images based on deep-learning neural-network model to obtain stitching features of the target images, and the stitching features are features of the target images for measuring similarity between images under different feature sizes;

selecting a reference image and a to-be-registered image from the target images;

taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature;

updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and performing image stitching of the reference image and the to-be-registered image on the to-be-stitched side based on the first stitching feature of the reference image under the maximum feature size, and based on the target stitching feature of the to-be-registered image under the maximum feature size.

The embodiments of the disclosure further provide an image stitching apparatus to improve applicability of image stitching, improve accuracy and speed of feature extraction of the image stitching, and improve efficiency and accuracy of the image stitching, the apparatus including:

a stitching feature extraction module configured to perform stitching feature extraction on target images based on deep-learning neural-network model to obtain the stitching features of the target images, and the stitching features are features of the target images for measuring similarity between images under different feature sizes;

a reference image and to-be-registered image selection module configured to select a reference image and a to-be-registered image from the target images;

a target stitching feature determination module configured to take the stitching feature of the reference image under a minimum feature size and on a to-be-stitched side of the reference image as a first stitching feature; calculate a similarity measure value between the first stitching feature and each of second stitching features based on the second stitching features of the to-be-registered image under the minimum feature size and based on the first stitching feature; and determine the second stitching feature, the similarity measure value between which and the first stitching feature exceeds a preset value as a target stitching feature;

a target stitching feature updating module configured to update the first stitching feature with the stitching feature of the reference image on the to-be-stitched side and under a feature size following the minimum feature size; update the second stitching feature with a stitching feature that is within a preset range of a position that corresponds to a stitching feature corresponding to the target stitching feature under the next feature size; recalculate the similarity measure value between the updated first stitching feature and each of the updated second stitching features; update the target stitching feature with the updated second stitching feature, the similarity measure value between which and the updated first stitching feature exceeds a preset value; and repeat the above steps of updating the first stitching feature, updating the second stitching feature and updating the target stitching feature, until the target stitching feature of the to-be-registered image under the maximum feature size is determined;

a to-be-stitched side image stitching module configured to perform image stitching of the reference image and the to-be-registered image on the to-be-stitched side based on the first stitching feature of the reference image under the maximum feature size, and based on the target stitching feature of the to-be-registered image under the maximum feature size.

The embodiments of the disclosure also provide a computer device including a memory, a processor and a computer program stored on the memory and executable on the processor, and the processor is configured to execute the computer program to implement the image stitching method described above.

The embodiments of the present disclosure also provide a computer-readable storage medium which stores a computer program for being executed by a processor to implement the image stitching method described above.

The embodiments of the present disclosure also provide a computer program product which includes a computer program for being executed by a processor to implement the image stitching method described above.

The embodiment of the present disclosure includes: performing stitching feature extraction on target images based on deep-learning neural-network model to obtain stitching features of the target images, and the stitching features are features of the target images for measuring similarity between images under different feature sizes; selecting a reference image and a to-be-registered image from the target images; taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature; updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and performing image stitching of the reference image and the to-be-registered image on the to-be-stitched side based on the first stitching feature of the reference image under the maximum feature size, and based on the target stitching feature of the to-be-registered image under the maximum feature size. Compared with the feature point extraction scheme in the prior art, the deep-learning neural-network model is used to extract the stitching feature, which improves the accuracy, speed and robustness of extraction of the stitching feature. In addition, according to the similarity measure of the stitching feature under different feature sizes, the target stitching feature of the to-be-registered image under the maximum feature size may be quickly determined to perform image stitching, which improves the efficiency and accuracy of the image stitching, and can be applied to the stitching of large-size images with short distance and large parallax, and improves the applicability of the image stitching.

BRIEF DESCRIPTION OF THE DRAWINGS

In order to more clearly illustrate the embodiments of the disclosure or the technical solution in the prior art, drawings that need to be used in the embodiments or the prior art will be simply introduced below, obviously the drawings in the following description are merely some examples of the disclosure, for persons ordinarily skilled in the art, it is also possible to obtain other drawings based on these drawings without making inventive efforts. In the drawings.

DESCRIPTION OF THE EMBODIMENTS

Figure 1:
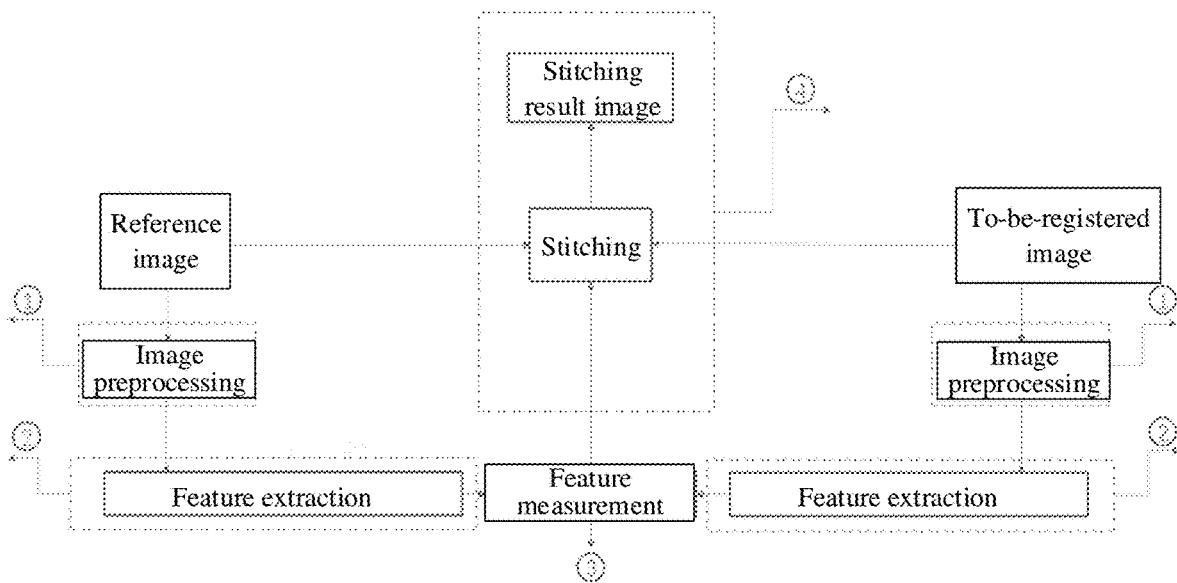
FIG. 1 is a diagram illustrating a specific example of an image stitching method according to an embodiment of the disclosure.

In order to more clearly illustrate purpose, technical solution and advantages according to embodiments of the disclosure, hereinafter the embodiments of the disclosure will be further described in detail in combination with the drawings. Here in the text, the schematic embodiments of the disclosure and the description thereof are used for illustrating the disclosure and do not intended to be a limitation of the disclosure.

The term "and/or" herein only describes an association relationship, indicating that there may be three kinds of relations. For example, A and/or B, may indicate three cases that there is A alone, there are A and B simultaneously, and there is B alone. In addition, the term "at least one" herein means any one of many or any combination of at least two of many, for example, including at least one of A, B, and C;

and may mean including any one or more elements selected from a set consisting of A, B and C.

In the description of the specification, the terms "comprising", "including", "having", "containing", etc., are all open terms, that is, indicate "including but not limited to". Reference terms "an embodiment", "a specific embodiment", "some embodiments", "for example" and the like are described to mean that specific features, structures or characteristics described in the embodiment or example are included in at least one embodiment or example of the present application. In the description, exemplary expression of the above terms does not necessarily refer to the same embodiment or example. Moreover, the described specific features, structures or characteristics may be combined in a suitable manner in any one or more of the embodiments or examples. The sequence of steps involved in each embodiment is used to schematically illustrate implementation of the present application, and the sequence of steps is not limited and may be adjusted as necessary.

The obtainment, storage, using, processing or the like of data in the technical solution of the present disclosure all comply with the relevant provisions of national laws and regulations.

Image stitching technology refers to a method of stitching multiple overlapping images of the same scene into a large image. General paradigm of the traditional image stitching method is composed of feature point extraction, feature matching, transformation matrix estimation, image transformation and image fusion. Also, different traditional image stitching methods mainly adopt different methods at different stages in the paradigm. With the rise of deep-learning, image stitching based on deep-learning has also developed rapidly. Most of the image stitching methods based on deep-learning are similar to traditional image stitching methods, to extract features mainly through deep neural-network and to learn and obtain optimal transformation-matrix parameters for subsequent image transformation and image fusion.

However, many actual image stitching scenes have the problems of close distance, large parallax, multiple images and large size, and there are many problems when using the above mentioned stitching methods. For example, when large-size pictures need to be stitched, features cannot be extracted (too much memory) by the traditional stitching methods; and when images with large parallax need to be stitched, the current stitching methods based on deep-learning may produce an image with a large amount of ghost.

For example, at the current stage, the image stitching feature is extracted and the image stitching is performed mainly by the following schemes:

1. The feature points are extracted from the reference image and the to-be-registered image by using feature extraction operators such as Harris operator, SIFT (Scale Invariant Feature Transform) operator, SURF (Speeded Up Robust Features) operator, LBF (Local Binary Features) operator and the like, similar feature points between the two images are matched, and the transformation matrix is calculated to transform the to-be-registered image, and then the two images are stitched.

2. Deep convolutional neural-network is used to extract the features of the reference image and the to-be-registered image, and the transformation matrix is used as a learning parameter to learn an optimal transformation matrix, and then the to-be-registered image is transformed and thereafter the image is stitched.

However, the above prior art has the following problems:

1. It is necessary to use the feature extraction operators to extract the feature points of the whole image. As a result, when resolution of a picture is too high, the memory consumption is too large to complete the feature extraction process, that is, it is impossible to stitch pictures with too high resolution.

2. The transformation matrix is used as a learning parameter to learn an optimal transformation matrix, and then the to-be-registered image is transformed and thereafter the image is stitched, and in the case of large parallax, the ghosting condition is serious. Although features can be extracted from the image with high resolution, the stitching effect is poor.

Figure 6:
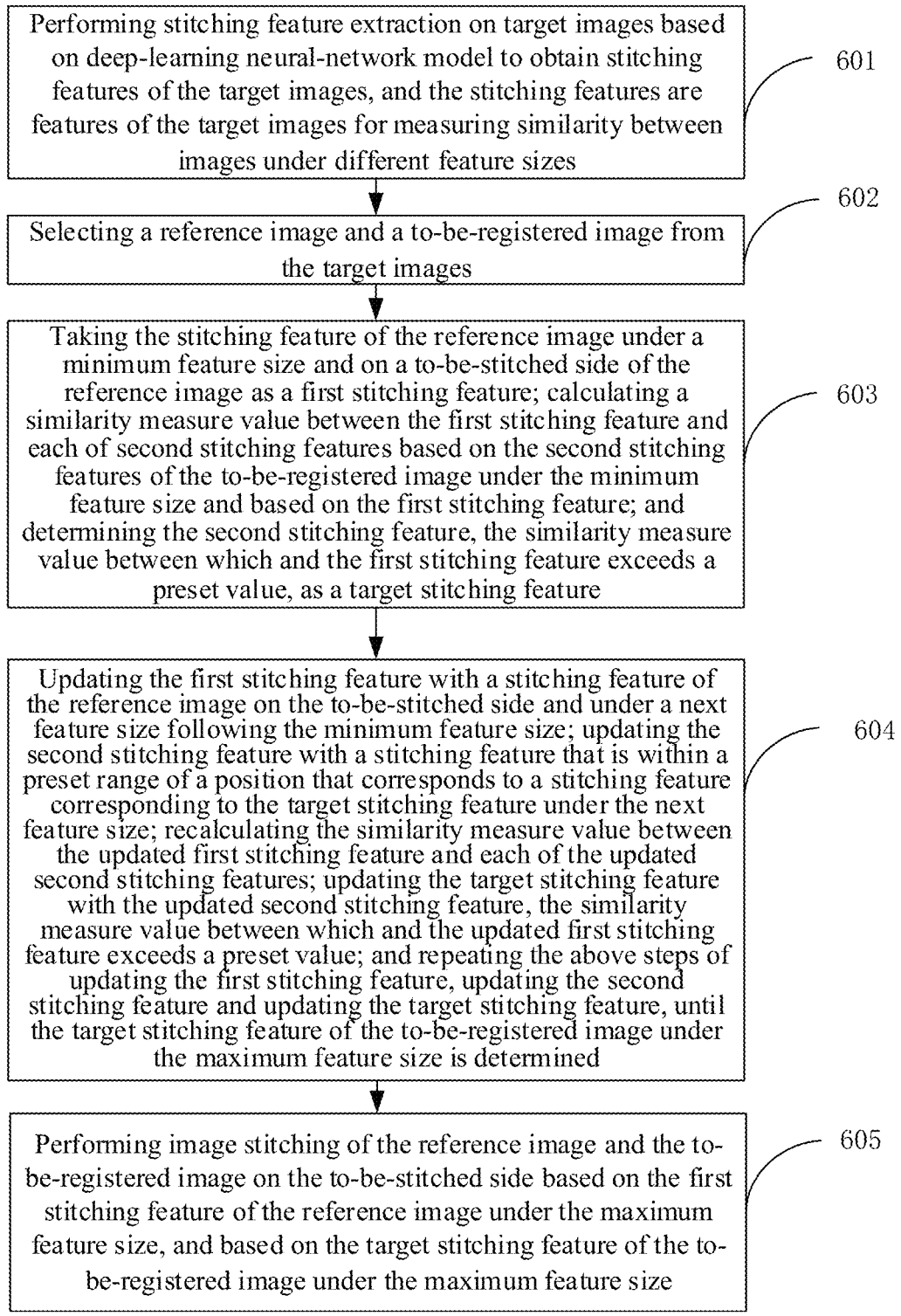
FIG. 6 is a flow schematic diagram of an image stitching method according to an embodiment of the disclosure.

In order to solve the above problems, the embodiments of the disclosure provide an image stitching method which can be applied to image stitching in the case of short distance, large parallax, multiple images and large size, to improve the applicability of the image stitching, improve accuracy and speed of extraction of the image stitching feature, improve the efficiency and accuracy of the image stitching, can effectively stitch images of short distance, large parallax, multiple images and large size, and avoid out of memory and ghost phenomenon when extracting features. Referring to FIG. 6, the method may include:

a step 601: performing stitching feature extraction on target images based on deep-learning neural-network model to obtain stitching features of the target images, and the stitching features are features of the target images for measuring similarity between images under different feature sizes;

a step 602: selecting a reference image and a to-be-registered image from the target images;

a step 603: taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature;

a step 604: updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and a step 605: performing image stitching of the reference image and the to-be-registered image on the to-be-stitched side based on the first stitching feature of the reference image under the maximum feature size, and based on the target stitching feature of the to-be-registered image under the maximum feature size The embodiment of the present disclosure includes: performing stitching feature extraction on target images based on deep-learning neural-network model to obtain stitching features of the target images, and the stitching features are features of the target images for measuring similarity between images under different feature sizes; selecting a reference image and a to-be-registered image from the target images; taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature; updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and performing image stitching of the reference image and the to-be-registered image on the to-be-stitched side based on the first stitching feature of the reference image under the maximum feature size, and based on the target stitching feature of the to-be-registered image under the maximum feature size. Compared with the feature point extraction scheme in the prior art, the deep-learning neural-network model is used to extract the stitching feature, which improves the accuracy, speed and robustness of extraction of the stitching feature. In addition, according to the similarity measure of the stitching feature under different feature sizes, the target stitching feature of the to-be-registered image under the maximum feature size may be quickly determined to perform image stitching, which improves the efficiency and accuracy of the image stitching, and can be applied to the stitching of large-size images with short distance and large parallax, and improves the applicability of the image stitching.

In specific implementation, firstly extracting stitching features of a target images based on deep-learning neural-network model to obtain the stitching features of the target images, and the stitching features are features of the target image for measuring similarity between images under different feature sizes.

In the embodiment, the stitching features are used to measure similarity between images and are finally used for image stitching. And accordingly, a stitching feature of a target image may be extracted to obtain the stitching feature of the target image, which is not specifically defined in the disclosure, and a solution "based on deep-learning neural-network model" given in the disclosure is an embodiment.

In an embodiment, the method further includes:

performing image padding processing and image normalization processing on the target images to obtain processed target images; and performing the stitching feature extraction on the target images to obtain the stitching features of the target images, including:

performing stitching feature extraction on the processed target images to obtain the stitching features of the processed target images.

In an embodiment, the performing image padding processing and image normalization processing on the target images to obtain the processed target images includes:

performing image padding processing on the target image by taking the maximum value selected from height and width of the image as the image size after image padding; and performing image normalization processing on the target images that have been performed with the image padding processing, to obtain the processed target images.

In the embodiment, image preprocessing may include: performing size adjustment, edge padding, normalization and other operations on the image.

In an embodiment, the performing stitching feature extraction on target images based on deep-learning neural-network model to obtain stitching features of the target images, includes:

inputting the target images into an image stitching feature extraction model to obtain the stitching features of the target images, and the image stitching feature extraction model corresponds to a stitching task type of the target images; the image stitching feature extraction model is obtained by training the deep-learning neural-network with a historical stitching image data set as training data; and the historical stitching image data set includes historical stitching images corresponding to the stitching task type, and stitching features corresponding to the historical stitching images.

In the embodiment, the pre-processed images may be extracted by using deep convolutional neural-network.

The image stitching feature extraction model corresponds to a stitching task type of the target image. For example, according to the task type of the image stitching, backbone trained by a target detection network may be used for feature extraction, and for example, backbone of products detection network may be used as much as possible for feature extraction of shelf image stitching; in which the backbone is a feature extraction network which has a function of extracting information from a picture, and the backbone may be a neural-network model formed by directly loading the trained model parameters.

In an embodiment, the image stitching feature extraction model includes a plurality of feature pyramid layers for extracting stitching features of the image under different sizes.

In the embodiment, compared with the traditional method of extracting features based on feature points, in the present disclosure, a deep neural-network is used to extract features, and a single-layer output network or a multi-layer feature pyramid may be used for extracting the feature of image stitching. The stitching feature with the minimum feature size is a feature with the minimum size outputted from a pyramid feature layer.

In an embodiment, the method further includes:
determining a plurality of feature pyramid layers by:
selecting a first feature pyramid layer by taking a product of width as well as height of the target image and a preset proportion as a target size;
updating the target size with the product of a width and height of an image corresponding to the target size with the preset proportion; and selecting a feature pyramid layer of the corresponding size based on the updated target size; and
repeating the above steps of updating the target size and selecting a feature pyramid layer of the corresponding size based on the updated target size, until the size of the selected feature pyramid layer is less than a preset value.

In the embodiment, by implementing the above steps of updating the target size and selecting a feature pyramid layer corresponding to the updated target size based on the updated target size, a repeated downsampling process of the feature sizes can be implemented to determine the feature pyramid layer under each feature size.

Figure 2:
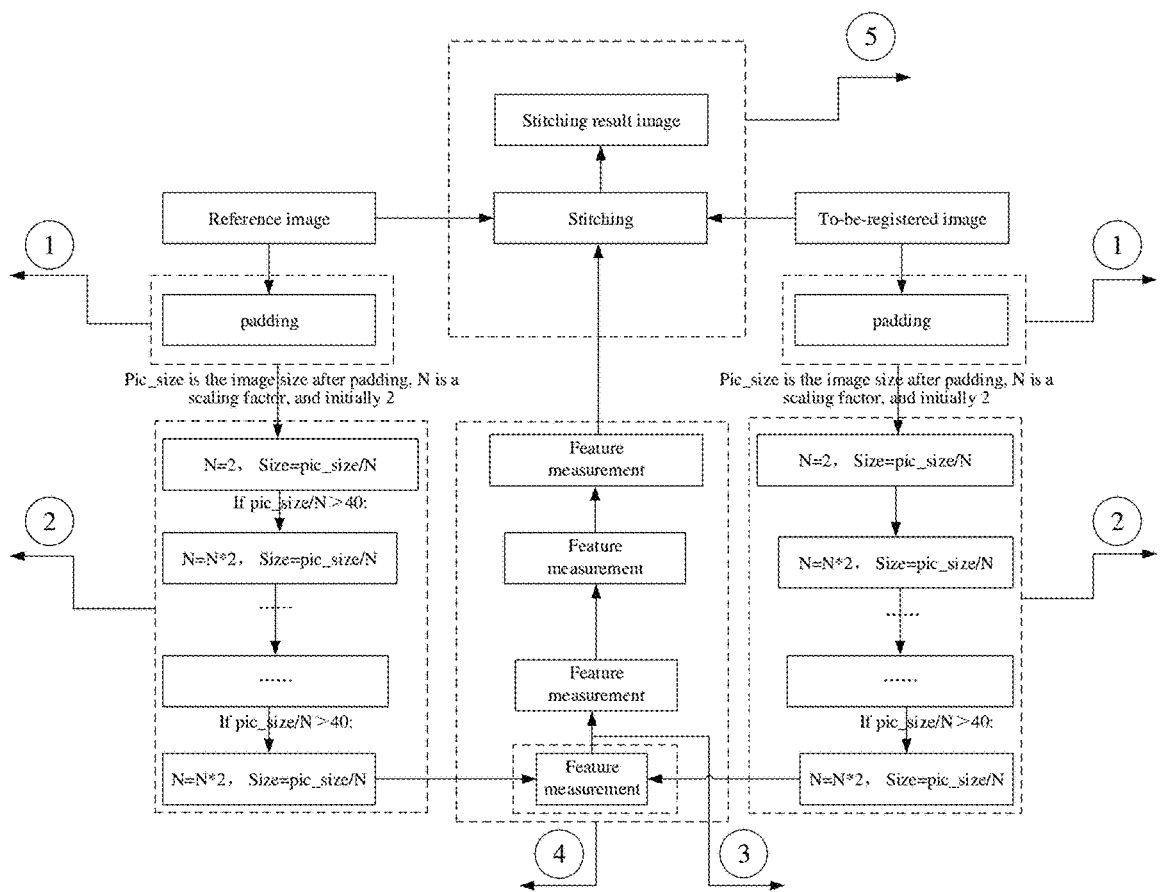
FIG. 2 is a diagram illustrating a specific example of an image stitching method according to an embodiment of the disclosure.

An example, referring to FIG. 2, where pic_size is the width and height of the image (large-size images generally have a resolution of 4 k or above) after image preprocessing, such as padding, a feature layer of the first layer that has the size of pic_size/4 is selected, and then a double downsampled feature layer is continuously selected until the size of the feature layer is less than a preset value (such as 40 pixels), until the selection is completed.

In specific implementation, selecting the reference image and the to-be-registered image from the target images, after extracting the stitching features of the target images based on deep-learning neural-network model to obtain the stitching features of the target images; and
taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature.

In an embodiment, the similarity measure value is calculated based on Euclidean distance and Cosine similarity between the stitching features.

The similarity measure value between the first stitching feature and each of the second stitching features is calculated in accordance with the following formula:

$$L_2^i(x_A, y_a) = \|x_A^i - y_a\| \quad (1)$$

$$\text{Cosine}^i(x_A, y_a) = \frac{x_A^i * y_a}{\|x_A^i\| * \|y_a\|} \quad (2)$$

$$\text{dist}^i = \text{sum}(\text{Normalized}(L_2^i, \text{Cosine}^i)) \quad (3)$$

where $x_A^i$ denotes the i-th second stitching feature; $y_a$ denotes the first stitching feature; $\text{Cosine}^i(x_A, y_a)$ denotes Cosine similarity between the first stitching feature and the i-th second stitching feature; $L_2^i(x_A, y_a)$ denotes an Euclidean distance between the first stitching feature and the i-th second stitching feature; and $\text{dist}^i$ denotes the similarity measure value between the first stitching feature and the i-th second stitching feature.

In the embodiment, $x_A$ in the formula (1) denotes all the stitching features of the to-be-registered image of which similarity needs to be measured, $y_a$ denotes the first stitching feature determined by the reference image, and another expression formula of formula (3) is as follows:

$$\text{dist}=(((L_2-\min(L_2,\text{Cosine}))/(\max(L_2,\text{Cosine})-\min(L_2,\text{Cosine})))+((\text{Cosine}-\min(L_2,\text{Cosine}))/(\max(L_2,\text{Cosine})-\min(L_2,\text{Cosine}))))$$

In the embodiment, the feature measurement manner mainly includes Euclidean distance, Cosine similarity, Mahalanobis distance and Manhattan distance, etc. Through the feature measurement of the extracted features, feature area of the two most similar to-be-stitched images are obtained. In addition, the selected regions for measuring feature are also different between horizontal stitching and longitudinally stitching.

In an embodiment, the method further includes:
when the to-be-stitched side of the reference image refers to both sides of the reference image in the horizontal direction, taking each stitching feature of the to-be-registered image in a direction perpendicular to the horizontal direction and under the minimum feature size as the second stitching feature; and
when the to-be-stitched side of the reference image refers to both sides of the reference image in the vertical direction, taking each stitching feature of the to-be-registered image in a direction perpendicular to the vertical direction and under the minimum feature size as the second stitching feature.

Figure 3:
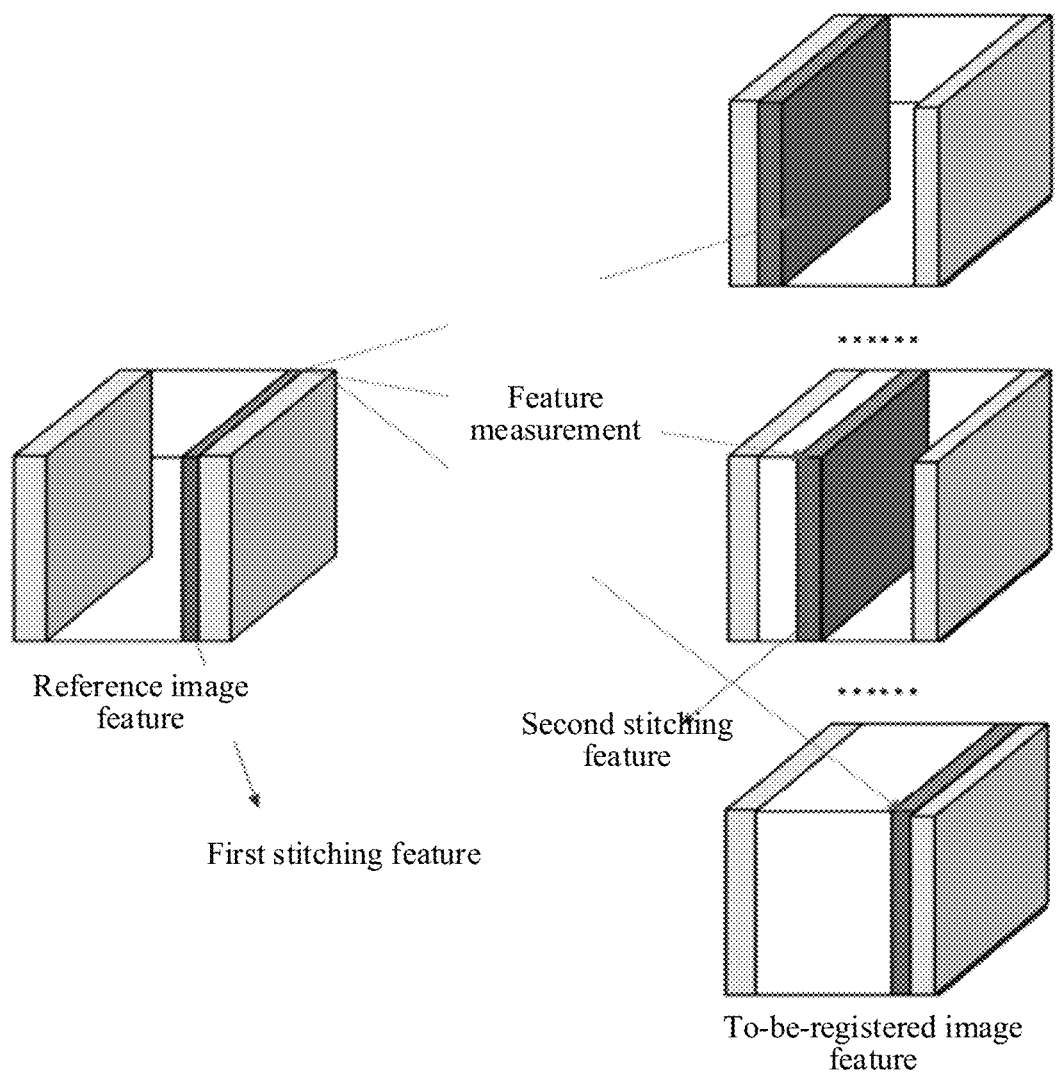
FIG. 3 is a diagram illustrating a specific example of an image stitching method according to an embodiment of the disclosure.
Figure 4:
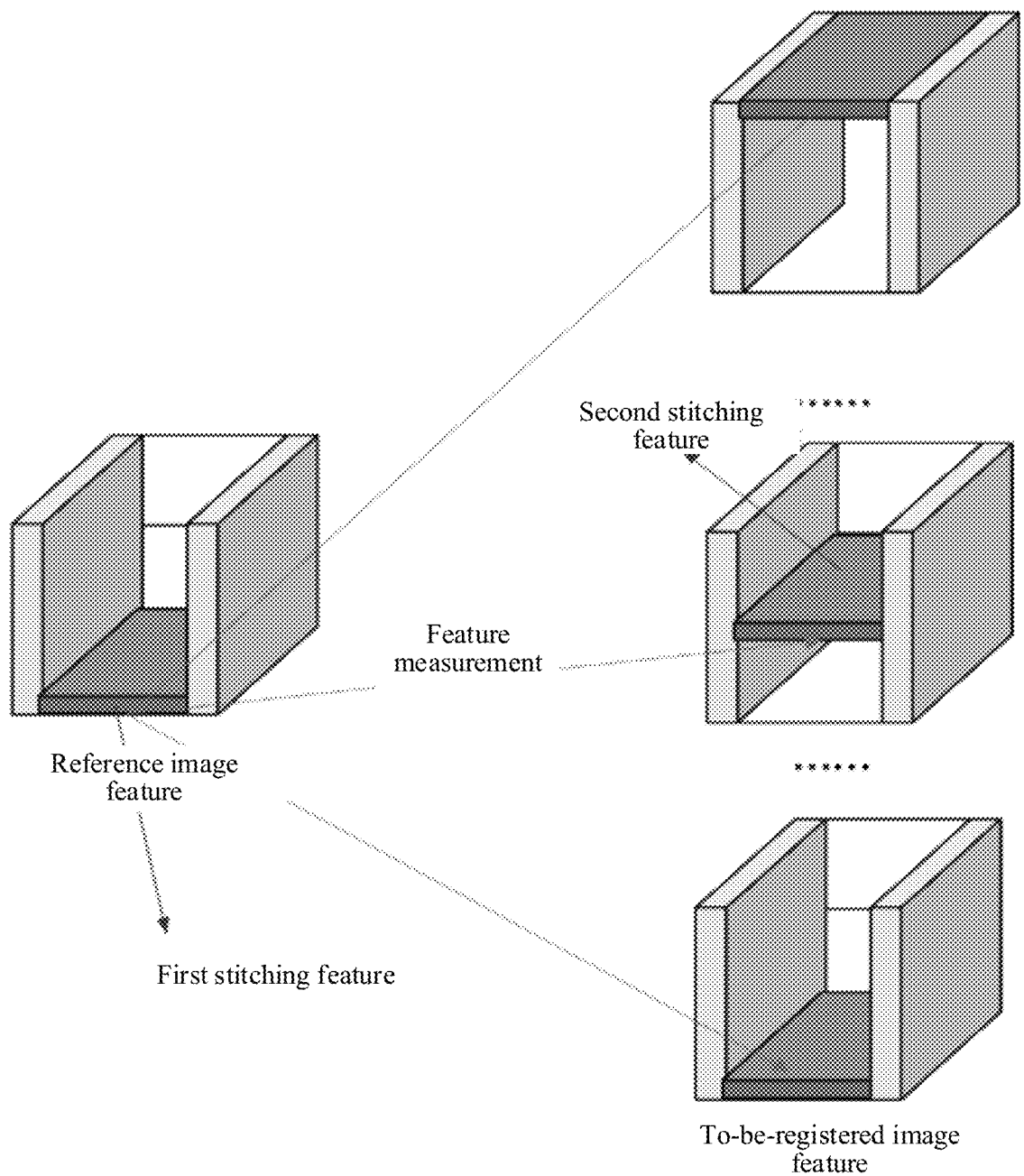
FIG. 4 is a diagram illustrating a specific example of an image stitching method according to an embodiment of the disclosure.

In an example:
when the to-be-stitched side of the reference image refers to both sides of the reference image in the horizontal direction, taking FIG. 3 as an example which shows the case that an image whose height is larger than width is subject to padding at left and right, for the reference image (i.e., the left figure in FIG. 3), firstly the rightmost feature patch (that is, a vector block corresponding to the stitching feature) excluding the padding area may be selected, to perform feature similarity measurement with all patch features of the to-be-registered image; the similarity measure value between the rightmost feature patch and each patch in all the patch features of the to-be-registered image is calculated; the patch, the similarity measure value between which and the rightmost feature patch exceeds the preset value, is determined as a target patch;
when the to-be-stitched side of the reference image refers to both sides of the reference image in the vertical direction, like the horizontal stitching, taking FIG. 4 as an example which shows the case that an image whose height is larger than width is subject to padding at left and right, for the reference image (i.e., the left figure in FIG. 4), firstly the bottommost feature patch excluding the padding area may be selected, to perform feature measurement with all the corresponding patch features of the to-be-registered image; the similarity measure value between the bottommost feature patch and each patch in all the patch features of the to-be-registered image is calculated; the patch, the similarity measure value between which and the bottommost feature patch exceeds the preset value, is determined as a target patch.

In specific implementation, after determining the second stitching feature, the similarity measure value between which and the first stitching feature exceeds a preset value, as a target stitching feature, updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined.

In the embodiment, by repeating the above steps of updating the first stitching feature, updating the second stitching feature and updating the target stitching feature, target stitching features under feature sizes from small to large can be determined, so as to accurately match the target stitching feature of the to-be-registered image under the maximum feature size.

In the above embodiment, the preset range is used to represent a specified number of stitching features on a side of a position that corresponds the corresponding stitching feature; the specified number is the product of the total number of the stitching features included in the reference image under the current feature size and the specified proportion; the specified proportion may be 5%, or may be freely set according to the actual use needs.

Figure 5:
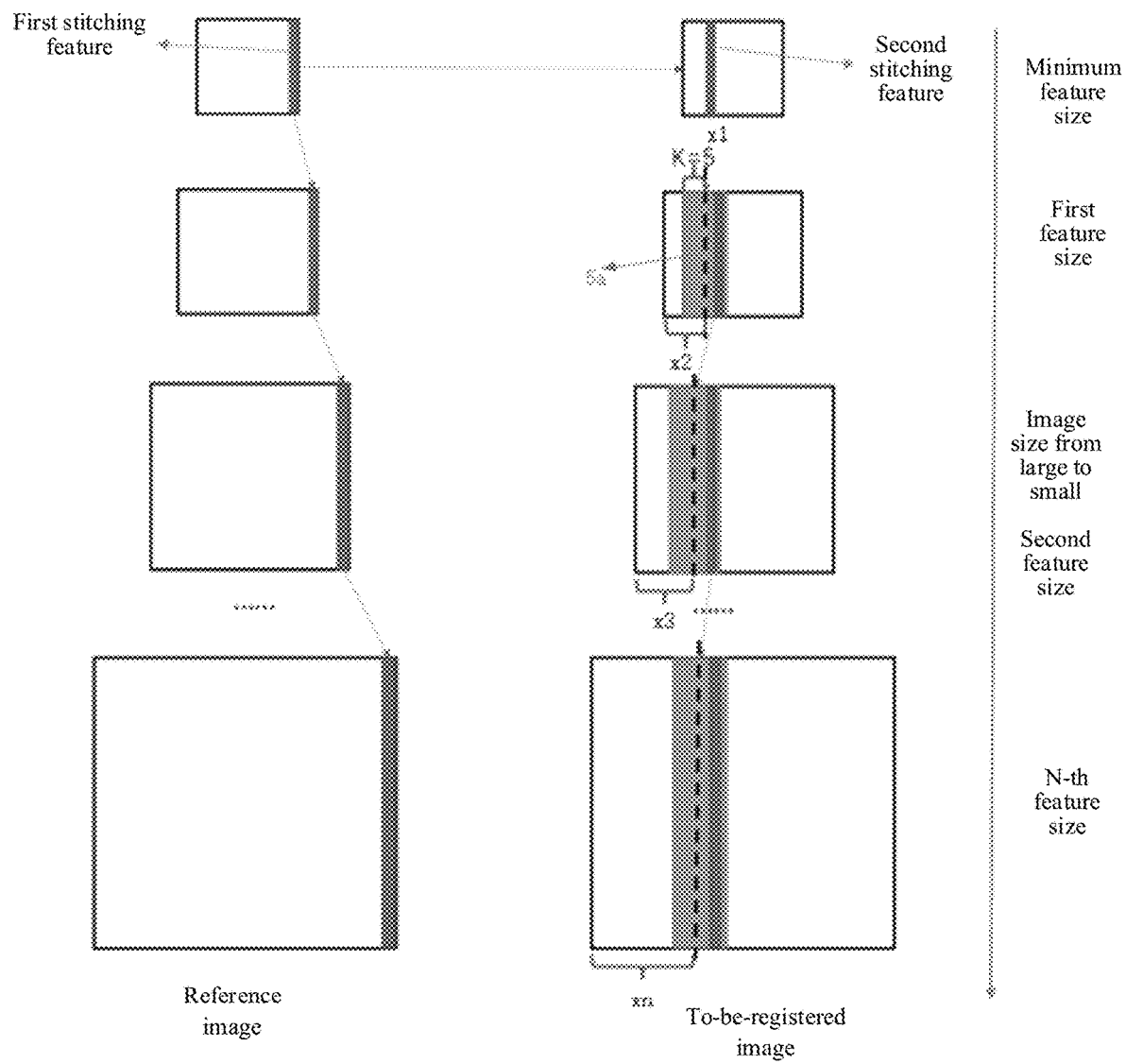
FIG. 5 is a diagram illustrating a specific example of an image stitching method according to an embodiment of the disclosure.

As shown in FIG. 5, in the to-be-registered image under the feature size shown in the second column of FIG. 5, K=5 represents the preset range (such as color block numbered 5a in FIG. 5) in which a specified number (5) of stitching features are located on a side (i.e., left side) of a position where the corresponding stitching feature (as shown by the black dashed line in FIG. 5) is located.

In the above embodiment, updating the second stitching feature with a stitching feature of the target stitching feature within a preset range of position corresponding to the stitching feature under the next feature size, may define a selection range of the target stitching feature under the next feature size, may avoid the process of selecting all stitching features under the next feature size, and improves selection efficiency of the target stitching feature. In addition, by setting the preset range, the position of the corresponding target stitching feature under the next feature size is further defined, and the selection efficiency of the stitching feature is improved.

In the implementation, after the target stitching feature of the to-be-registered image under the maximum feature size is determined, performing image stitching of the reference image and the to-be-registered image on the to-be-stitched side based on the first stitching feature of the reference image under the maximum feature size, and based on the target stitching feature of the to-be-registered image under the maximum feature size.

In the embodiment, the images may be stitched after obtaining the most similar feature areas (i.e., the first stitching feature of the reference image under the maximum feature size, and the target stitching feature of the to-be-registered image under the maximum feature size). The overlapping area of the to-be-registered image is reserved in the horizontal stitching, and the overlapping area of the lower side of to-be-registered image is reserved as far as possible in the longitudinal stitching.

In an embodiment, performing image stitching of the reference image and the to-be-registered image on the to-be-stitched side based on the first stitching feature of the reference image under the maximum feature size, and based on the target stitching feature of the to-be-registered image under the maximum feature size, including:

when the reference image is horizontally stitched, horizontally stitching the reference image and the to-be-registered image by taking a position that corresponds the target stitching feature of the to-be-registered image under the maximum feature size as a stitching line; and reserving, in an overlapping area, the one of the reference image and the to-be-registered image that is located on the right side of the other in the process of horizontal stitching of the images; and when the reference image is longitudinally stitched, longitudinally stitching the reference image and the to-be-registered image by taking a position that corresponds the target stitching feature of the to-be-registered image under the maximum feature size as a stitching line; and reserving, in an overlapping area, the one of the reference image and the to-be-registered image that is located on the lower side of the other in the process of longitudinal stitching of the images.

In the embodiment, if the left image and right image are to be stitched, the right image is the rear image, then after the position of the stitching line is determined, the right image is covered rear the stitching line of the left image, that is, the rear image is retained as the overlapping area.

For example, when the reference image is horizontally stitched, the stitching features at left and right sides of the stitching image are selected; and the vertical stitching feature of the to-be-registered image is selected; the similarity measure values between the stitching features at the left and right sides of the reference image and different vertical stitching features of different to-be-registered images are calculated.

Based on the similarity measure values, the vertical stitching feature of the to-be-registered image of which the similarity measure value with the stitching features at the left and right sides of each reference image exceeds the preset value is determined as the target stitching feature.

For another example, when the reference image is longitudinally stitched, the stitching features at upper and lower sides of the stitching image are selected; and the horizontal stitching feature of the to-be-registered image is selected; the similarity measure values between the stitching feature at the upper and lower sides of the reference image and different horizontal stitching features of different to-be-registered images are calculated.

Based on the similarity measure values, the horizontal stitching feature of the to-be-registered image of which the similarity measure value with the stitching feature at the upper and lower sides of each reference image exceeds the preset value is determined as the target stitching feature.

For another example, when the reference image is horizontally stitched, the images of the reference image and the to-be-registered image are horizontally stitched by taking the position corresponding to the determined target stitching feature as a stitching line; and the rear image is reserved as the overlapping area in the process of horizontal stitching of the images.

For another example, when the reference image is longitudinally stitched, the images of the reference image and the to-be-registered image are longitudinally stitched by taking the position that corresponds the determined target stitching feature as a stitching line; and the intermediate image is reserved as the overlapping area in the process of longitudinal stitching of the images.

A specific embodiment is given below to illustrate the specific application of the method of the present disclosure.

As shown in FIG. 1, the process of this embodiment can be mainly divided into four parts, namely, image preprocessing, feature extraction, feature measurement, and image stitching.

1. Image Preprocessing:

Image preprocessing refers to a necessary means that, by performing size adjustment, edge padding, normalization and other operations on the image, such that the processed image can be input into the deep-learning neural-network for learning, and the present disclosure mainly adopts the operations of edge padding and normalization.

2. Feature Extraction:

Compared with the traditional method of extracting features on the basis of feature points, the deep neural-network has shown better performance in various aspects, so that in the present disclosure, a deep neural-network is used to extract features, and a single-layer output network or a multi-layer feature pyramid may be used for extracting the feature of image stitching.

3. Feature Measurement:

Feature measurement manner mainly includes Euclidean distance, Cosine similarity, Mahalanobis distance and Manhattan distance, etc. Through the feature measurement of the extracted features, feature areas of the two most similar to-be-stitched images are obtained. The selected regions for measuring feature are also different between horizontal stitching and longitudinally stitching, and details can be seen in the specific implementation process.

4. Information Transfer from Coarse to Fine

Firstly, the stitching feature under the minimum feature size is determined; then, the stitching feature under the minimum feature size is used to obtain the stitching feature under the next feature size, and by analogy, the most similar feature vector is continuously refined until it is transferred to the original image size, and the stitching line is finally obtained, i.e., the position that corresponds the determined target stitching feature.

5. Image Stitching:

The images can be stitched after obtaining the most similar feature area (i.e., the stitching line). The overlapping area of the to-be-registered image is reserved in the horizontal stitching, and the overlapping area of the lower side of to-be-registered image is reserved as far as possible in the longitudinal stitching.

As shown in FIG. 2, this embodiment also specifically describes an image stitching method in the case of short distance, large parallax, multiple images and large size based on deep-learning, and the specific implementation details are as follows:

1. Image preprocessing (necessary means before inputting the image into deep-learning neural-network):

image padding: the maximum value between height and width of the image is taken as the image size after padding (i.e., padding (1) to a rectangle), the padding size of the short side is p, and the formula is shown below:

$$p = (\max(\text{width}, \text{height}) - \min(\text{width}, \text{height}))/2$$

(2) image normalization: normalization operation is performed on the image, i.e., each of pixel values is divided by 255.0.

2. Feature pyramid (features under different sizes are extracted for subsequent feature measurement):

(1) Feature extraction: the pre-processed image is processed using deep convolutional neural-network (based on the task type of the image stitching, backbone (backbone network) trained by a target detection network can be used for feature extraction, and for example, backbone of goods detection network may be used for feature extraction in the shelf image stitching);

(2) Feature pyramid layer selection: referring to FIG. 2, where pic_size is the width and height of the image (large-size images generally have a resolution of 4 k or above) after image preprocessing of padding, that is, the selected first layer is a feature layer with the size of pic_size/4, and then a double downsampled feature layer is continuously selected until the size of the feature layer is less than a preset size (such as a feature block of 40 pixels×40 pixels), and the selection is completed;

3. Feature measurement (used to determine the most similar area, to obtain the stitching line for image stitching):

(1). Feature measurement method:

The feature measurement manner in this embodiment combines Euclidean distance and Cosine similarity, in which both the distance of pixel-only between features and the distance of structural similarity between features are considered. Formula (2) is the Euclidean distance, formula (3) is the Cosine similarity, and formula (4) is the sum of both normalized Euclidean distance and the cosine similarity, where $X_A$ is the feature of the to-be-registered image and $y_a$ is the feature of the reference image.

The similarity measure value between the first stitching feature and each of the second stitching features is calculated in accordance with the following formula:

$$L_2^i(x_A, y_a) = \|x_A^i - y_a\|$$

$$\text{Cosine}^i(x_A, y_a) = \frac{x_A^i * y_a}{\|x_A^i\| * \|y_a\|}$$

$$\text{dist}^i = \text{sum}(\text{Normalized}(L_2^i, \text{Cosine}^i))$$

where $x_A^i$ denotes the i-th second stitching feature; $y_a$ denotes the first stitching feature; $\text{Cosine}^i(x_A, y_a)$ denotes Cosine similarity between the first stitching feature and the i-th second stitching feature; $L_2^i(x_A, y_a)$ denotes an Euclidean distance between the first stitching feature and the i-th second stitching feature; $\text{dist}^i$ denotes the similarity measure value between the first stitching feature and the i-th second stitching feature.

Because the $L_2$ Euclidean distance is calculated by calculating pixel difference, that is, the similarity between pixels; Cosine is calculated by calculating cosine similarity between two features, reflecting the similarity between structures.

(2) Feature measurement area selection:

Horizontal stitching: as shown in FIG. 3, which shows the case that an image whose height is larger than width is subject to padding at left and right (the light gray area is the padding area); in FIG. 3, each feature block has gray padding areas on the left and right sides, that is, this area is the area padded with 0 or 255 pixel values; for the reference image (that is, the left figure in FIG. 3), firstly the rightmost feature patch (that is, a vector block corresponding to the stitching feature) excluding the padding area may be selected, to perform feature similarity measurement with all patch features of the to-be-registered image; the similarity measure value between the rightmost feature patch and each patch in all the patch features of the to-be-registered image is calculated; and the patch, the similarity measure value between which and the rightmost feature patch exceeds the preset value, is determined as a target patch; and Longitudinal stitching: like the horizontal stitching, FIG. 4 shows the case that an image whose height is larger than width is subject to padding at left and right, for the reference image (i.e., the left figure in FIG. 4), firstly the bottommost feature patch excluding the padding area may be selected, to perform feature measurement with all the corresponding patch features of the to-be-registered image; the similarity measure value between the bottommost feature patch and each patch in all the patch features of the to-be-registered image is calculated; and the patch, the similarity measure value between which and the bottommost feature patch exceeds the preset value, is determined as a target patch.

4. Information Transfer from Coarse to Fine

As shown in FIG. 5, taking horizontal stitching as an example, the feature measurement is performed initially on the extracted feature image (this feature image is the feature output from one of the layers in the feature pyramid) under the smallest size (such as a feature block of 40 pixels×40 pixels). For the reference image, the last one-dimensional patch is always selected (i.e., taking the stitching feature of the reference image on the to-be-stitched side under the minimum feature size as a first stitching feature) to measure with each patch (i.e., the second stitching feature of the to-be-registered image under the minimum feature size) of the to-be-registered image, and the patch with the most matched feature is determined.

The feature image under the minimum feature size in FIG. 5 is the feature image where x1 is located; and the x1 color block area represents the second stitching feature, the similarity measure value between which and the first stitching feature exceeds a preset value, i.e., represents the target stitching feature under the minimum feature size, and x1 also represents the coordinates of the target stitching feature under this minimum feature size; the target stitching feature under this minimum feature size is then passed to the feature image of the next size by double upsampling; and the upsampling process may include: passing the stitching information to a feature image that is twice as large as the feature image. For example, under the feature size in the second column in FIG. 5, the second stitching feature is updated with the stitching feature within the preset range (i.e., 5a color block area) of a position that corresponds a stitching feature corresponding to the target stitching feature x1 under the next feature size. Specifically, the position that corresponds the stitching feature corresponding to the target stitching feature x1 under the next feature size is twice the value of x1.

Under the third feature size, the position where the stitching feature corresponding to the target stitching feature x1 is located is twice the value of x2. By analogy, the position of the most similar patch vector is refined continuously until it is transferred to the original image size, and the target stitching feature xn, that is, the stitching line, is finally obtained.

Similarly, the last dimension of the reference image is used as the reference patch. For the to-be-registered image, only 2x and k adjacent patches at left and right sides thereof serve as to-be-registered features in the current area (i.e., updating the second stitching feature with a stitching feature that is within a preset range of a position that corresponds a stitching feature corresponding to the target stitching feature under the next feature size). By analogy, the position of the most similar patch vector is refined continuously until it is transferred to the original image size, and the stitching line is finally obtained, i.e., the position that corresponds the determined target stitching feature.

As an example, in FIG. 5, for the reference image, the last one-dimensional patch vector is selected to represent the stitching feature on the above stitching side. For the to-be-registered image, the determined patch with the highest similarity is taken as the target stitching feature described above; and when representative measurement information is transferred from coarse to fine, k adjacent patches in the left and right areas are used for fine tuning, and for example k=5 at left and right. The patch usually takes a feature vector with widths of 2 to 4.

5. Image Stitching:

Horizontal stitching: stitching is carried out based on the determined stitching line, and the rear image is reserved as the overlapping area.

Longitudinal stitching: during the stitching of multiple images, and the intermediate images is reserved as the overlapping area to ensure a positive angle of view.

Taking supermarket shelf image stitching as an example, exemplarily upper, middle and lower cameras are used to movably take photo of the shelf images.

For longitudinal stitching:

On the basis that the image stitching line and the most similar area are obtained, the most similar area of image taken by the middle camera is retained at first to perform stitching at upper, middle and lower positions, which thus can ensure that the goods displayed in the image after stitching is taken in the front, and can be better used for subsequent operations.

For horizontal stitching:

Taking twelve horizontal images as an example, with half as the boundary, that is, the first six images and the last six images. For the first six images, the most similar area of the right image is reserved for stitching, and for the last six images, the most similar area of the left image is reserved for stitching, so as to ensure that the goods are taken in front during the horizontal stitching.

In the embodiment, 1. Deep neural-network is used to extract the similarity features of the stitching images for measurement, which is greatly improved in terms of accuracy, speed and robustness compared with the traditional feature point extraction method. 2. The measurement method combines Euclidean distance and Cosine similarity, and the similarity between pixels and between structures are both considered. 3. Through information transfer from coarse to fine, the calculation consumption of feature measures in the image feature pyramid layers is greatly accelerated, and at the same time accuracy transfer of the feature measures is guaranteed.

The following beneficial effects may be achieved:
1. Oversize images can be stitched; 2. stitching problem of ghosting under large parallax can be solved; 3. compared with the method of feature point extraction, the stitching can be greatly speeded up through information transfer from coarse to fine.

Of course, it can be understood that there may be other variations for the detailed flow described above, and the relevant variations should fall within the scope of protection of the present disclosure.

The embodiment of the present disclosure includes: performing stitching feature extraction on target images based on deep-learning neural-network model to obtain stitching features of the target images, and the stitching features are features of the target images for measuring similarity between images under different feature sizes; selecting a reference image and a to-be-registered image from the target images; taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature; updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and performing image stitching of the reference image and the to-be-registered image on the to-be-stitched side based on the first stitching feature of the reference image under the maximum feature size, and based on the target stitching feature of the to-be-registered image under the maximum feature size. Compared with the feature point extraction scheme in the prior art, the deep-learning neural-network model is used to extract the stitching feature, which improves the accuracy, speed and robustness of extraction of the stitching feature. In addition, according to the similarity measure of the stitching feature under different feature sizes, the target stitching feature of the to-be-registered image under the maximum feature size may be quickly determined to perform image stitching, which improves the efficiency and accuracy of the image stitching, and can be applied to the stitching of large-size images with short distance and large parallax, and improves the applicability of the image stitching.

Figure 7:
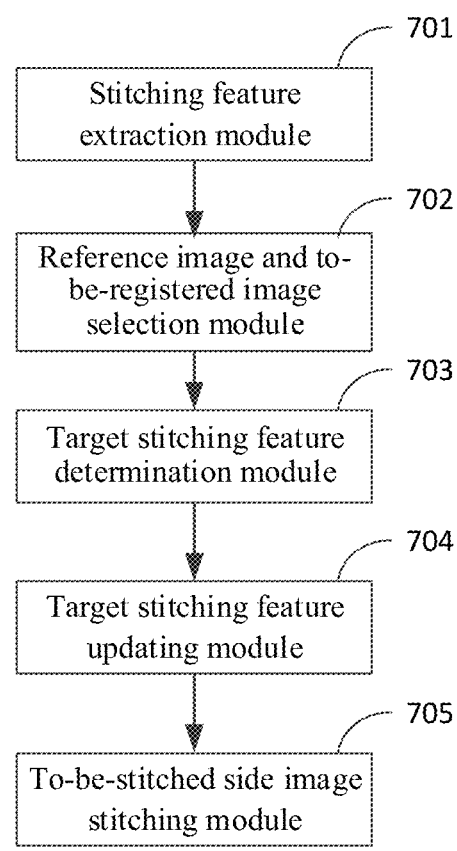
FIG. 7 is an example diagram of the structure of an image stitching apparatus according to an embodiment of the disclosure.

The embodiments of the disclosure further provide an image stitching apparatus to improve applicability of image stitching, improve accuracy and speed of feature extraction of the image stitching, and improve efficiency and accuracy of the image stitching, as shown in FIG. 7, the apparatus including:

a stitching feature extraction module 701 configured to perform stitching feature extraction on target images based on deep-learning neural-network model to obtain the stitching features of the target images, and the stitching features are features of the target images for measuring similarity between images under different feature sizes;

a reference image and to-be-registered image selection module 702 configured to select a reference image and a to-be-registered image from the target images;

a target stitching feature determination module 703 configured to take the stitching feature of the reference image under a minimum feature size and on a to-be-stitched side of the reference image as a first stitching feature; calculate a similarity measure value between the first stitching feature and each of second stitching features based on the second stitching features of the to-be-registered image under the minimum feature size and based on the first stitching feature; and determine the second stitching feature, the similarity measure value between which and the first stitching feature exceeds a preset value as a target stitching feature;

a target stitching feature updating module 704 configured to update the first stitching feature with the stitching feature of the reference image on the to-be-stitched side and under a feature size following the minimum feature size; update the second stitching feature with a stitching feature that is within a preset range of a position that corresponds to a stitching feature corresponding to the target stitching feature under the next feature size; recalculate the similarity measure value between the updated first stitching feature and each of the updated second stitching features; update the target stitching feature with the updated second stitching feature, the similarity measure value between which and the updated first stitching feature exceeds a preset value; and repeat the above steps of updating the first stitching feature, updating the second stitching feature and updating the target stitching feature, until the target stitching feature of the to-be-registered image under the maximum feature size is determined; and a to-be-stitched side image stitching module 705 configured to perform image stitching of the reference image and the to-be-registered image on the to-be-stitched side based on the first stitching feature of the reference image under the maximum feature size, and based on the target stitching feature of the to-be-registered image under the maximum feature size.

In an embodiment, the apparatus further includes an image padding processing and image normalization processing module configured to:

perform image padding processing and image normalization processing on the target images to obtain processed target images; and the performing the stitching feature extraction on the target images to obtain the stitching features of the target images, including:

performing stitching feature extraction on the processed target images to obtain the stitching features of the processed target images.

In an embodiment, the image padding processing and image normalization processing module is specifically configured to:

perform image padding processing on the target images by taking the maximum value selected from height and width of the image as the image size after image padding; and perform image normalization processing on the target images that have been performed with the image padding processing, to obtain the processed target images.

In an embodiment, the stitching feature extraction module is specifically configured to:

input the target images into an image stitching feature extraction model to obtain the stitching features of the target images, and the image stitching feature extraction model corresponds to a stitching task type of the target images; the image stitching feature extraction model is obtained by training the deep-learning neural-network with a historical stitching image data set as training data; and the historical stitching image data set includes historical stitching images corresponding to the stitching task type, and stitching features corresponding to the historical stitching images.

In an embodiment, the image stitching feature extraction model includes a plurality of feature pyramid layers for extracting stitching features of the image under different sizes.

In an embodiment, the apparatus further includes:
a feature pyramid layer specific module configured to determine a plurality of feature pyramid layers by:
selecting a first feature pyramid layer by taking a product of width as well as height of the target image and a preset proportion as a target size;
repeating the downsampling process for the first size based on a second preset proportion to determine a second size; and selecting a second feature pyramid layer based on the second size; and
repeating the above steps until the size of the selected feature pyramid layer is less than a preset value.

In an embodiment, the similarity measure value is obtained by calculating Euclidean distance and Cosine similarity between the stitching features.

The target stitching feature determination module is specifically configured to:
calculate the similarity measure value between the first stitching feature and each of the second stitching features in accordance with the following formula:

$$L_2^i(x_A, y_a) = \|x_A^i - y_a\|$$

$$\text{Cosine}^i(x_A, y_a) = \frac{x_A^i * y_a}{\|x_A^i\| * \|y_a\|}$$

$$\text{dist}^i = \text{sum}\left(\text{Normalized}(L_2^i, \text{Cosine}^i)\right)$$

where $x_A^i$ denotes the i-th second stitching feature; $y_a$ denotes the first stitching feature; $\text{Cosine}^i(x_A, y_a)$ denotes Cosine similarity between the first stitching feature and the i-th second stitching feature; $L_2^i(x_A, y_a)$ denotes an Euclidean distance between the first stitching feature and the i-th second stitching feature; and $\text{dist}^i$ denotes the similarity measure value between the first stitching feature and the i-th second stitching feature.

In an embodiment, the apparatus further includes:
a second stitching feature determination module configured to:
when the to-be-stitched side of the reference image refers to both sides of the reference image in the horizontal direction, take each stitching feature of the to-be-registered image in a direction perpendicular to the horizontal direction and under the minimum feature size as the second stitching feature; and
when the to-be-stitched side of the reference image refers to both sides of the reference image in the vertical direction, take each stitching feature of the to-be-registered image in a direction perpendicular to the vertical direction and under the minimum feature size as the second stitching feature.

In an embodiment, the to-be-stitched side image stitching module is specifically configured to:
when the reference image is horizontally stitched, horizontally stitch the reference image and the to-be-registered image by taking a position that corresponds the target stitching feature of the to-be-registered image under the maximum feature size as a stitching line; and reserve, in an overlapping area, the one of the reference image and the to-be-registered image that is located on the right side of the other in the process of horizontal stitching of the images; and when the reference image is longitudinally stitched, longitudinally stitch the reference image and the to-be-registered image by taking a position that corresponds the target stitching feature of the to-be-registered image under the maximum feature size as a stitching line; and reserve, in an overlapping area, the one of the reference image and the to-be-registered image that is located on the lower side of the other in the process of longitudinal stitching of the images.

Embodiments of the disclosure provide an embodiment of a computer device configured to implement all or part of the image stitching method described above, and the computer device specifically includes the following:
a processor, a memory, a communications interface, and a bus; the processor, the memory, and the communications interface complete communication with each other through the bus; the communications interface is used for implementing information transmission between related devices; the computer device may be a desktop computer, a tablet computer, or a mobile terminal or the like, and the present embodiment is not limited thereto. In the present embodiment, the computer device may be implemented with reference to the embodiment of implementing the image stitching method and the embodiment of implementing the image stitching apparatus, the contents thereof are incorporated herein and will not be repeated.

Figure 8:
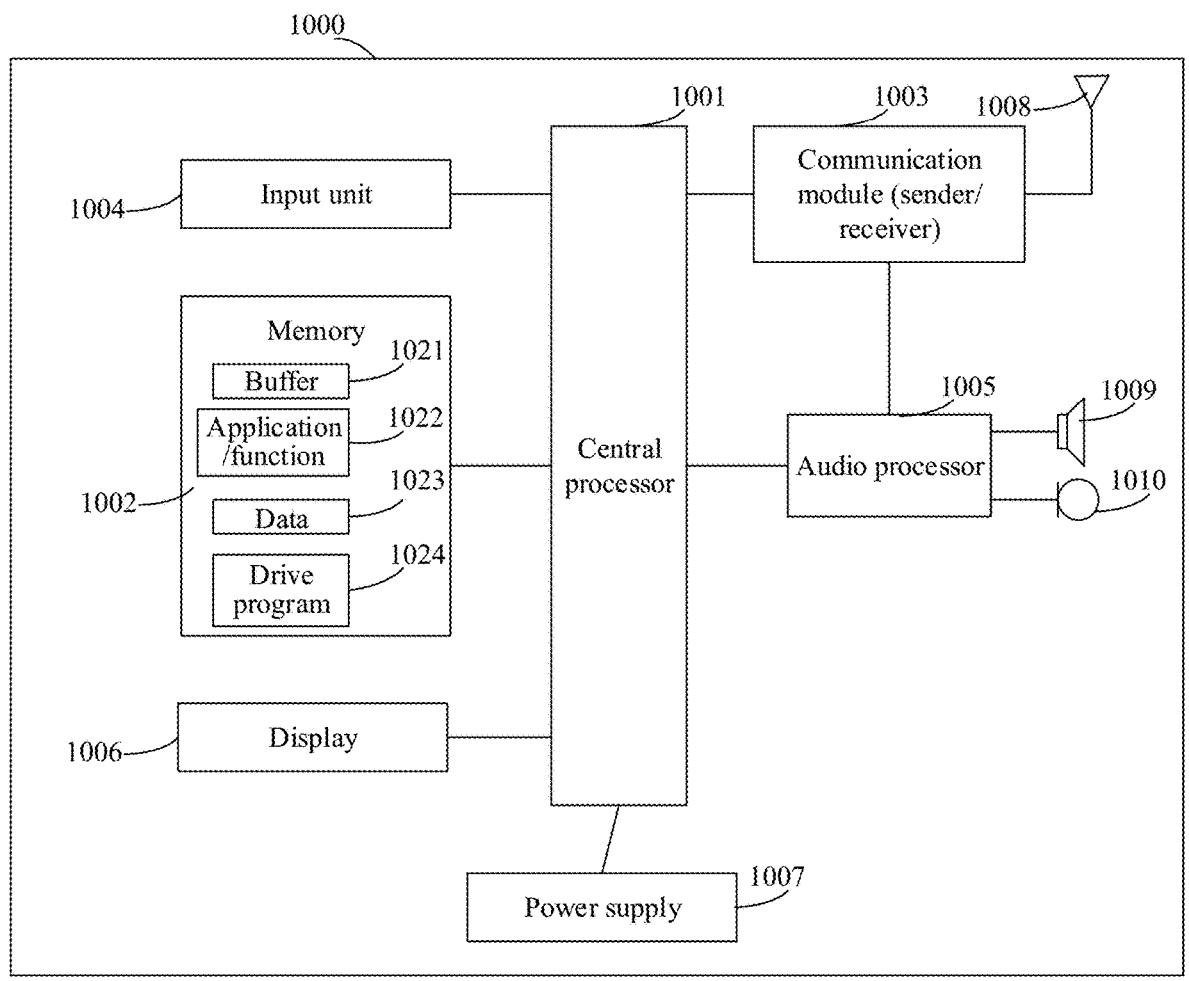
FIG. 8 is a schematic diagram of a computer device used for image stitching according to an embodiment of the disclosure.

FIG. 8 is a schematic block diagram of a system composition of a computer device 1000 according to an embodiment of the present application. As shown in FIG. 8, the computer device 1000 may include a central processor 1001 and a memory 1002; the memory 1002 is coupled to the central processor 1001. It is worth noting that FIG. 8 is exemplary; other types of structures may also be used in addition to or instead of the structure to implement telecommunications functions or other functions.

In an embodiment, an image stitching function may be integrated into the central processor 1001. The central processor 1001 may be configured to perform the following control of:
performing stitching feature extraction on target images based on deep-learning neural-network model to obtain stitching features of the target images, and the stitching features are features of the target images for measuring similarity between images under different feature sizes;
selecting a reference image and a to-be-registered image from the target images;
taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature;
updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and performing image stitching of the reference image and the to-be-registered image on the to-be-stitched side based on the first stitching feature of the reference image under the maximum feature size, and based on the target stitching feature of the to-be-registered image under the maximum feature size.

In another embodiment, the image stitching device may be configured separately from the central processor 1001. For example, the image stitching apparatus may be configured as a chip connected to the central processor 1001, and the image stitching function can be realized through the control of the central processor.

As shown in FIG. 8, the computer device 1000 may further include a communication module 1003, an input unit 1004, an audio processor 1005, a display 1006, and a power supply 1007. It is worth noting that the computer device 1000 does not either necessarily include all of the components shown in FIG. 8; in addition, the computer device 1000 may also include components not shown in FIG. 8, with reference to the prior art.

As shown in FIG. 8, the central processor 1001, sometimes referred to as a controller or an operational control, may include a microprocessor or other processor apparatuses and/or logic apparatuses, the central processor 1001 receives inputs and controls operation of the components of the computer device 1000.

Where, the memory 1002 may be, for example, one or more selected from a buffer, a flash memory, a hard drive, a removable medium, a volatile memory, a non-volatile memory, or other suitable apparatuses. The above-described failure-related information may be stored, and in addition, a program for executing the relevant information may be stored. And the central processor 1001 can execute the program stored in the memory 1002 to implement information storage or processing and the like.

The input unit 1004 provides an input to the central processor 1001. The input unit 1004 is, for example, a key or a touch input apparatus. The power supply 1007 is used to provide power to the computer device 1000. The display 1006 is used for displaying objects to be displayed, such as images and text, and the like. The display may be, for example, an LCD (Liquid Crystal Display) display, but is not limited thereto.

The memory 1002 may be a solid state memory such as read only memory (ROM), random access memory (RAM), SIM card, or the like. The memory may also be such a memory that it saves information even when power is off, on which data can be selectively erased and more data is set, and an example of which is sometimes referred to as an EPROM (Erasable Programmable Read Only Memory) or the like. The memory 1002 may also be some other types of apparatuses. The memory 1002 includes a buffer memory 1021 (sometimes referred to as a buffer). The memory 1002 may include an application/function storage unit 1022 configured to store a flow for performing operation of the computer device 1000 by the central processor 1001, or application programs and function programs.

The memory 1002 may also include a data storage unit 1023 configured to store data, such as contacts, numeric data, pictures, sounds, and/or any other data used by the computer device. A drive program storage unit 1024 of the memory 1002 may include various drive programs of the computer device for communication functions and/or for executing other functions of the electronic device, such as a messaging application, an address book application, and the like.

The communication module 1003 is a sender/receiver 1003 that sends and receives signals via an antenna 1008. The communication module (sender/receiver) 1003 is coupled to the central processor 1001 to provide input signals and to receive output signals, which may be the same as in the case of conventional mobile communication terminals.

Based on different communication technologies, a plurality of communication modules 1003, such as a cellular network module, a Bluetooth module, and/or a wireless local area network module and the like may be provided in the same computer device. The communication module (sender/receiver) 1003 is also coupled to a speaker 1009 and a microphone 1010 via an audio processor 1005 to provide an audio output via the speaker 1009, and to receive an audio input from the microphone 1010, thereby achieving the usual telecommunications functions. The audio processor 1005 may include any suitable buffer, decoder, amplifier, or the like. In addition, the audio processor 1005 is also coupled to the central processor 1001 so that sound can be recorded on the local machine by the microphone 1010, and the sound stored on the local machine can be played through the speaker 1009.

The embodiments of the present disclosure also provide a computer-readable storage medium storing a computer program for being executed by a processor to implement the image stitching method described above.

The embodiments of the present disclosure also provide a computer program product including a computer program for being executed by a processor to implement the image stitching method described above.

The embodiment of the present disclosure includes: performing stitching feature extraction on target images based on deep-learning neural-network model to obtain stitching features of the target images, and the stitching features are features of the target images for measuring similarity between images under different feature sizes; selecting a reference image and a to-be-registered image from the target images; taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature; updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and performing image stitching of the reference image and the to-be-registered image on the to-be-stitched side based on the first stitching feature of the reference image under the maximum feature size, and based on the target stitching feature of the to-be-registered image under the maximum feature size. Compared with the feature point extraction scheme in the prior art, the deep-learning neural-network model is used to extract the stitching feature, which improves the accuracy, speed and robustness of extraction of the stitching feature. In addition, according to the similarity measure of the stitching feature under different feature sizes, the target stitching feature of the to-be-registered image under the maximum feature size may be quickly determined to perform image stitching, which improves the efficiency and accuracy of the image stitching, and can be applied to the stitching of large-size images with short distance and large parallax, and improves the applicability of the image stitching.

Those skilled in the art shall understand that, the embodiments of the present disclosure may be provided as a method, a system or a computer program product. Therefore, the present disclosure may be configured with the forms of a full hardware example, a full software example, or combination of a software example and a hardware example. Moreover, the present disclosure may be configured with the form of a computer program product that is implemented on one or more computer-usable storage medium (including but not limited to a disk memory, a CD-ROM, an optical memory, and etc.) including computer-usable program codes.

The disclosure is described with reference to flow diagrams and/or block diagrams of the method, the apparatus (system) and the computer program product according to the embodiment of the disclosure. It should be understood that each flow and/or block in the flow diagrams and/or block diagrams, and the combination of the flows and/or blocks in the flow diagrams and/or block diagrams may be achieved by computer program commands. These computer program commands may be provided to a CPU of a general-purpose computer, a special-purpose computer, an embedded processor or other programmable data processing device to produce a machine, so that an apparatus for achieving functions designated in one or more flows in the flow diagrams and/or one or more blocks in the block diagrams can be generated by the command executed by the CPU of the computer or other programmable data processing device.

These computer program instructions may also be stored in a computer-readable memory that can guide a computer or other programmable data processing device to operate in a special way, so that the instruction stored in the computer-readable memory generates a manufactured product including an instruction device which achieves functions designated in one or more flows in the flow diagrams and/or one or more blocks in the block diagrams.

These computer program instructions may also be loaded on a computer or other programmable data processing device, on which a series of operation steps are executed to achieve processing by the computer, so that the instruction executed on the computer or other programmable data processing device is provided for being used in the steps of achieving functions designated in one or more flows in the flow diagrams and/or one or more blocks in the block diagrams.

The purpose, technical solution and beneficial effect of the disclosure have been further described in detail in the above specific embodiments, it should be understood that the above contents are merely specific embodiments of the disclosure and are not for limiting protection scope of the disclosure, and any modifications, equivalent replacements, improvements and the like within the spirit and principle of the present disclosure shall be included within the protection scope of the present disclosure.

What is claimed is:

1. An image stitching method, comprising:
performing stitching feature extraction on target images based on deep-learning neural-network model to obtain stitching features of the target images, wherein the stitching features are features of the target images for measuring similarity between images under different feature sizes;
selecting a reference image and a to-be-registered image from the target images;
taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature;
updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and
performing image stitching of the reference image and the to-be-registered image on the to-be-stitched side based on the first stitching feature of the reference image under the maximum feature size, and based on the target stitching feature of the to-be-registered image under the maximum feature size.

2. The image stitching method according to claim 1, further comprising:

performing image padding processing and image normalization processing on the target images to obtain processed target images; and performing the stitching feature extraction on the target images to obtain the stitching features of the target images, comprising:

performing stitching feature extraction on the processed target images to obtain the stitching features of the processed target images.

3. The image stitching method according to claim 2, wherein the performing image padding processing and image normalization processing on the target images to obtain the processed target images comprises:

performing image padding processing on the target images by taking the maximum value selected from height and width of the image as the image size after image padding; and performing image normalization processing on the target images that have been performed with the image padding processing, to obtain the processed target images.

4. The image stitching method according to claim 1, wherein the performing stitching feature extraction on target images based on deep-learning neural-network model to obtain stitching features of the target images comprises:

inputting the target images into an image stitching feature extraction model to obtain the stitching features of the target images, wherein the image stitching feature extraction model corresponds to a stitching task type of the target images; the image stitching feature extraction model is obtained by training the deep-learning neural-network with a historical stitching image data set as training data; and the historical stitching image data set comprises historical stitching images corresponding to the stitching task type, and stitching features corresponding to the historical stitching images.

5. The image stitching method according to claim 4, wherein the image stitching feature extraction model comprises a plurality of feature pyramid layers for extracting stitching features of the image under different sizes.

6. The image stitching method according to claim 4, further comprising:

determining a plurality of feature pyramid layers by:

selecting a first feature pyramid layer by taking a product of width as well as height of the target image and a preset proportion as a target size;

updating the target size with the product of a width and height of an image corresponding to the target size with the preset proportion; and selecting a feature pyramid layer of the corresponding size based on the updated target size; and repeating the above steps of updating the target size and selecting a feature pyramid layer of the corresponding size based on the updated target size, until the size of the selected feature pyramid layer is less than a preset value.

7. The image stitching method according to claim 1, wherein the similarity measure value is calculated based on Euclidean distance and Cosine similarity between the stitching features;

the similarity measure value between the first stitching feature and each of the second stitching features is calculated in accordance with the following formula:

$$L_2^i(x_A, y_a) = \|x_A^i - y_a\|$$

$$\mathrm{Cosine}^i(x_A, y_a) = \frac{x_A^i * y_a}{\|x_A^i\| * \|y_a\|}$$

$$\mathrm{dist}^i = \mathrm{sum}\left(\mathrm{Normalized}(L_2^i, \mathrm{Cosine}^i)\right)$$

where $x_A^i$ denotes the i-th second stitching feature; $y_a$ denotes the first stitching feature; $\mathrm{Cosine}^i(x_A, y_a)$ denotes Cosine similarity between the first stitching feature and the i-th second stitching feature; $L_2^i(x_A, y_a)$ denotes an Euclidean distance between the first stitching feature and the i-th second stitching feature; and $\mathrm{dist}^i$ denotes the similarity measure value between the first stitching feature and the i-th second stitching feature.

8. The image stitching method according to claim 1, further comprising:

when the to-be-stitched side of the reference image refers to both sides of the reference image in the horizontal direction, taking each stitching feature of the to-be-registered image in a direction perpendicular to the horizontal direction and under the minimum feature size as the second stitching feature; and when the to-be-stitched side of the reference image refers to both sides of the reference image in the vertical direction, taking each stitching feature of the to-be-registered image in a direction perpendicular to the vertical direction and under the minimum feature size as the second stitching feature.

9. The image stitching method according to claim 1, wherein performing image stitching of the reference image and the to-be-registered image on the to-be-stitched side based on the first stitching feature of the reference image under the maximum feature size, and based on the target stitching feature of the to-be-registered image under the maximum feature size comprises:

when the reference image is horizontally stitched, horizontally stitching the reference image and the to-be-registered image by taking a position that corresponds to the target stitching feature of the to-be-registered image under the maximum feature size as a stitching line; and reserving, in an overlapping area, the one of the reference image and the to-be-registered image that is located on the right side of the other in the process of horizontal stitching of the images; and when the reference image is longitudinally stitched, longitudinally stitching the reference image and the to-be-registered image by taking a position that corresponds to the target stitching feature of the to-be-registered image under the maximum feature size as a stitching line; and reserving, in an overlapping area, the one of the reference image and the to-be-registered image that is located on the lower side of the other in the process of longitudinal stitching of the images.

10. An image stitching apparatus, comprising:

a stitching feature extraction module configured to perform stitching feature extraction on target images based on deep-learning neural-network model to obtain the stitching features of the target images, wherein the stitching features are features of the target images for measuring similarity between images under different feature sizes;

a reference image and to-be-registered image selection module configured to select a reference image and a to-be-registered image from the target images;

a target stitching feature determination module configured to take the stitching feature of the reference image under a minimum feature size and on a to-be-stitched side of the reference image as a first stitching feature; calculate a similarity measure value between the first stitching feature and each of second stitching features based on the second stitching features of the to-be-registered image under the minimum feature size and based on the first stitching feature; and determine the second stitching feature, the similarity measure value between which and the first stitching feature exceeds a preset value as a target stitching feature;

a target stitching feature updating module configured to update the first stitching feature with the stitching feature of the reference image on the to-be-stitched side and under a feature size following the minimum feature size; update the second stitching feature with a stitching feature that is within a preset range of a position that corresponds to a stitching feature corresponding to the target stitching feature under the next feature size; recalculate the similarity measure value between the updated first stitching feature and each of the updated second stitching features; update the target stitching feature with the updated second stitching feature, the similarity measure value between which and the updated first stitching feature exceeds a preset value; and repeat the above steps of updating the first stitching feature, updating the second stitching feature and updating the target stitching feature, until the target stitching feature of the to-be-registered image under the maximum feature size is determined; and a to-be-stitched side image stitching module configured to perform image stitching of the reference image and the to-be-registered image on the to-be-stitched side based on the first stitching feature of the reference image under the maximum feature size, and based on the target stitching feature of the to-be-registered image under the maximum feature size.

11. The image stitching apparatus according to claim 10, further comprising:

an image padding processing and image normalization processing module configured to perform image padding processing and image normalization processing on the target images to obtain processed target images, wherein the performing the stitching feature extraction on the target images to obtain the stitching features of the target images comprises performing stitching feature extraction on the processed target images to obtain the stitching features of the processed target images.

12. The image stitching apparatus according to claim 10, wherein the stitching feature extraction module is specifically configured to:

input the target images into an image stitching feature extraction model to obtain the stitching features of the target images, wherein the image stitching feature extraction model corresponds to a stitching task type of the target images; the image stitching feature extraction model is obtained by training the deep-learning neural-network with a historical stitching image data set as training data; and the historical stitching image data set includes historical stitching images corresponding to the stitching task type, and stitching features corresponding to the historical stitching images.

13. The image stitching apparatus according to claim 12, further comprising a feature pyramid layer specific module configured to:

determine a plurality of feature pyramid layers by:

selecting a first feature pyramid layer by taking a product of width as well as height of the target image and a preset proportion as a target size;

repeating the downsampling process for the first size based on a second preset proportion to determine a second size; and selecting a second feature pyramid layer based on the second size; and repeating the above steps until the size of the selected feature pyramid layer is less than a preset value.

14. The image stitching apparatus according to claim 10, further comprising a second stitching feature determination module configured to:

when the to-be-stitched side of the reference image refers to both sides of the reference image in the horizontal direction, take each stitching feature of the to-be-registered image in a direction perpendicular to the horizontal direction and under the minimum feature size as the second stitching feature; and when the to-be-stitched side of the reference image refers to both sides of the reference image in the vertical direction, take each stitching feature of the to-be-registered image in a direction perpendicular to the vertical direction and under the minimum feature size as the second stitching feature.

15. A computer device comprising a memory, a processor and a computer program stored on the memory and executable on the processor, wherein the processor is configured to execute the computer program to implement the method comprising:

performing stitching feature extraction on target images based on deep-learning neural-network model to obtain stitching features of the target images, wherein the stitching features are features of the target images for measuring similarity between images under different feature sizes;

selecting a reference image and a to-be-registered image from the target images;

taking the stitching feature of the reference image under a minimum feature size and on a to-be-stitched side of the reference image as a first stitching feature; calculating a similarity measure value between the first stitching feature and each of second stitching features based on the second stitching features of the to-be-registered image under the minimum feature size and based on the first stitching feature; and determining the second stitching feature, the similarity measure value between which and the first stitching feature exceeds a preset value, as a target stitching feature;

updating the first stitching feature with a stitching feature of the reference image on the to-be-stitched side and under a next feature size following the minimum feature size; updating the second stitching feature with a stitching feature that is within a preset range of a position that corresponds to a stitching feature corresponding to the target stitching feature under the next feature size; recalculating the similarity measure value between the updated first stitching feature and each of the updated second stitching features; updating the target stitching feature with the updated second stitching feature, the similarity measure value between which and the updated first stitching feature exceeds a preset value; and repeating the above steps of updating the first stitching feature, updating the second stitching feature and updating the target stitching feature, until the target stitching feature of the to-be-registered image under the maximum feature size is determined; and performing image stitching of the reference image and the to-be-registered image on the to-be-stitched side based on the first stitching feature of the reference image under the maximum feature size, and based on the target stitching feature of the to-be-registered image under the maximum feature size.

16. The computer device according to claim 15, further comprising a second stitching feature determination module configured to:

performing image padding processing and image normalization processing on the target images to obtain processed target images; and performing the stitching feature extraction on the target images to obtain the stitching features of the target images, comprising:

performing stitching feature extraction on the processed target images to obtain the stitching features of the processed target images.

17. The computer device according to claim 15, wherein the performing stitching feature extraction on target images based on deep-learning neural-network model to obtain stitching features of the target images comprises:

inputting the target images into an image stitching feature extraction model to obtain the stitching features of the target images, wherein the image stitching feature extraction model corresponds to a stitching task type of the target images; the image stitching feature extraction model is obtained by training the deep-learning neural-network with a historical stitching image data set as training data; and the historical stitching image data set comprises historical stitching images corresponding to the stitching task type, and stitching features corresponding to the historical stitching images.

18. The computer device according to claim 17, further comprising:

determining a plurality of feature pyramid layers by:

selecting a first feature pyramid layer by taking a product of width as well as height of the target image and a preset proportion as a target size;

updating the target size with the product of a width and height of an image corresponding to the target size with the preset proportion; and selecting a feature pyramid layer of the corresponding size based on the updated target size; and repeating the above steps of updating the target size and selecting a feature pyramid layer of the corresponding size based on the updated target size, until the size of the selected feature pyramid layer is less than a preset value.

19. The computer device according to claim 17, further comprising:

when the to-be-stitched side of the reference image refers to both sides of the reference image in the horizontal direction, taking each stitching feature of the to-be-registered image in a direction perpendicular to the horizontal direction and under the minimum feature size as the second stitching feature; and when the to-be-stitched side of the reference image refers to both sides of the reference image in the vertical direction, taking each stitching feature of the to-be-registered image in a direction perpendicular to the vertical direction and under the minimum feature size as the second stitching feature.

* * * * *